United States Patent [19]
Hawker

[11] Patent Number: 5,382,039
[45] Date of Patent: Jan. 17, 1995

[54] SUSPENSION DEVICE FOR A SEAT OF A BICYCLE

[76] Inventor: Michael J. Hawker, 37 Lawnwood Dr., Williston, Vt. 05495

[21] Appl. No.: 65,585

[22] Filed: May 24, 1993

[51] Int. Cl.$^6$ ............................................. B62J 1/04
[52] U.S. Cl. .................................. 280/283; 248/600; 280/220; 297/215.13; 297/344.2
[58] Field of Search ................... 280/220, 283, 287; 248/600; 297/215.13, 344.20

[56] References Cited

U.S. PATENT DOCUMENTS 979,483  12/1910  Harley ................................. 280/283

FOREIGN PATENT DOCUMENTS 340435  10/1907  France ................................. 280/283
196781   5/1923  United Kingdom ................. 280/283

Primary Examiner—Mitchell J. Hill
Attorney, Agent, or Firm—Michael I. Kroll

[57] ABSTRACT

A suspension device is provided for a seat of a bicycle which consists of a telescoping seat post for carrying the seat. The bicycle has a frame with a generally upright seat tube for receiving the seat post. A structure is for securing the seat post to the seat tube. An apparatus is within the seat post for absorbing a shock received to the frame, thereby eliminating a jarring condition normally caused to a rider sitting on the seat, while the bicycle travels over rough surfaces.

7 Claims, 4 Drawing Sheets

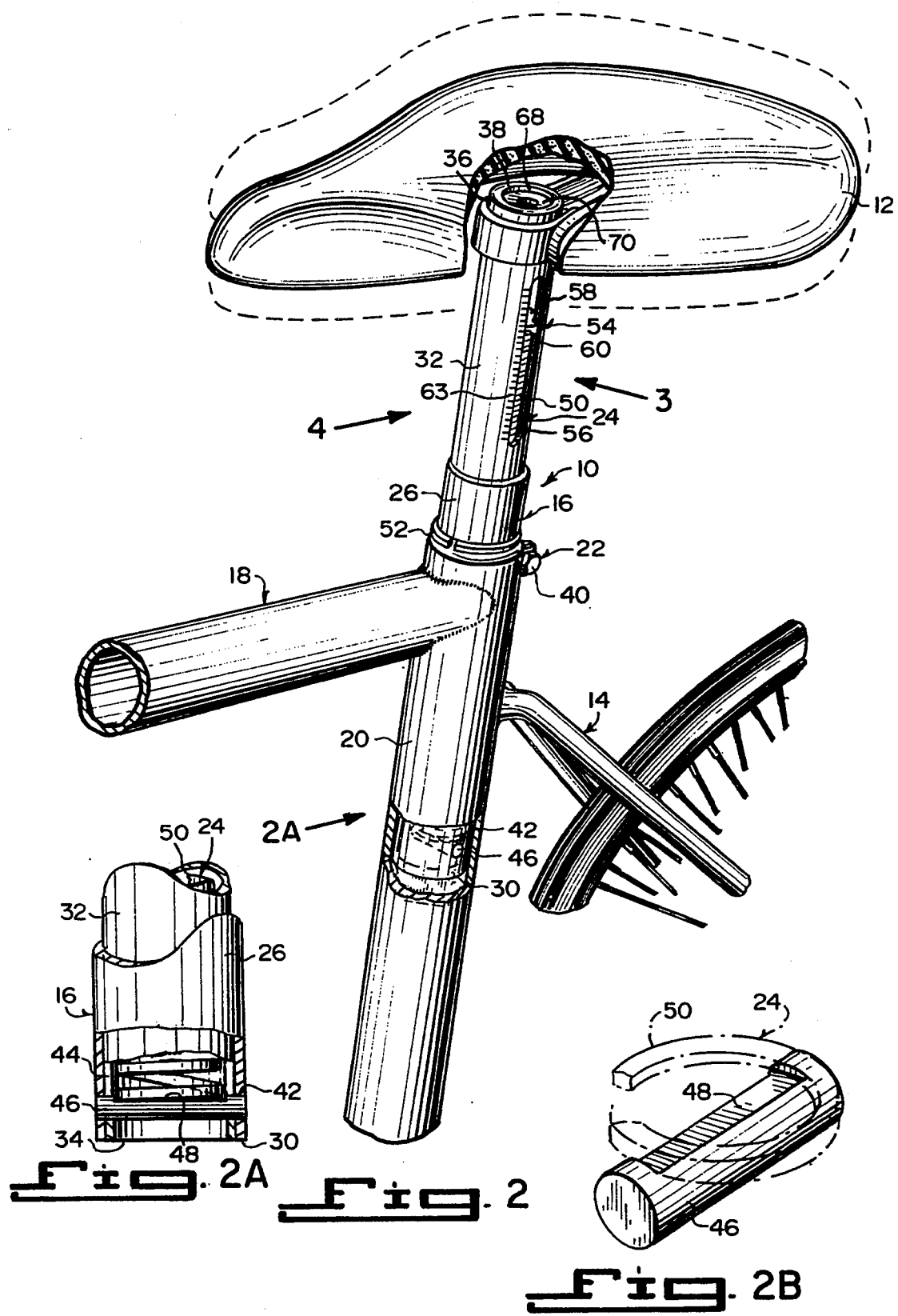

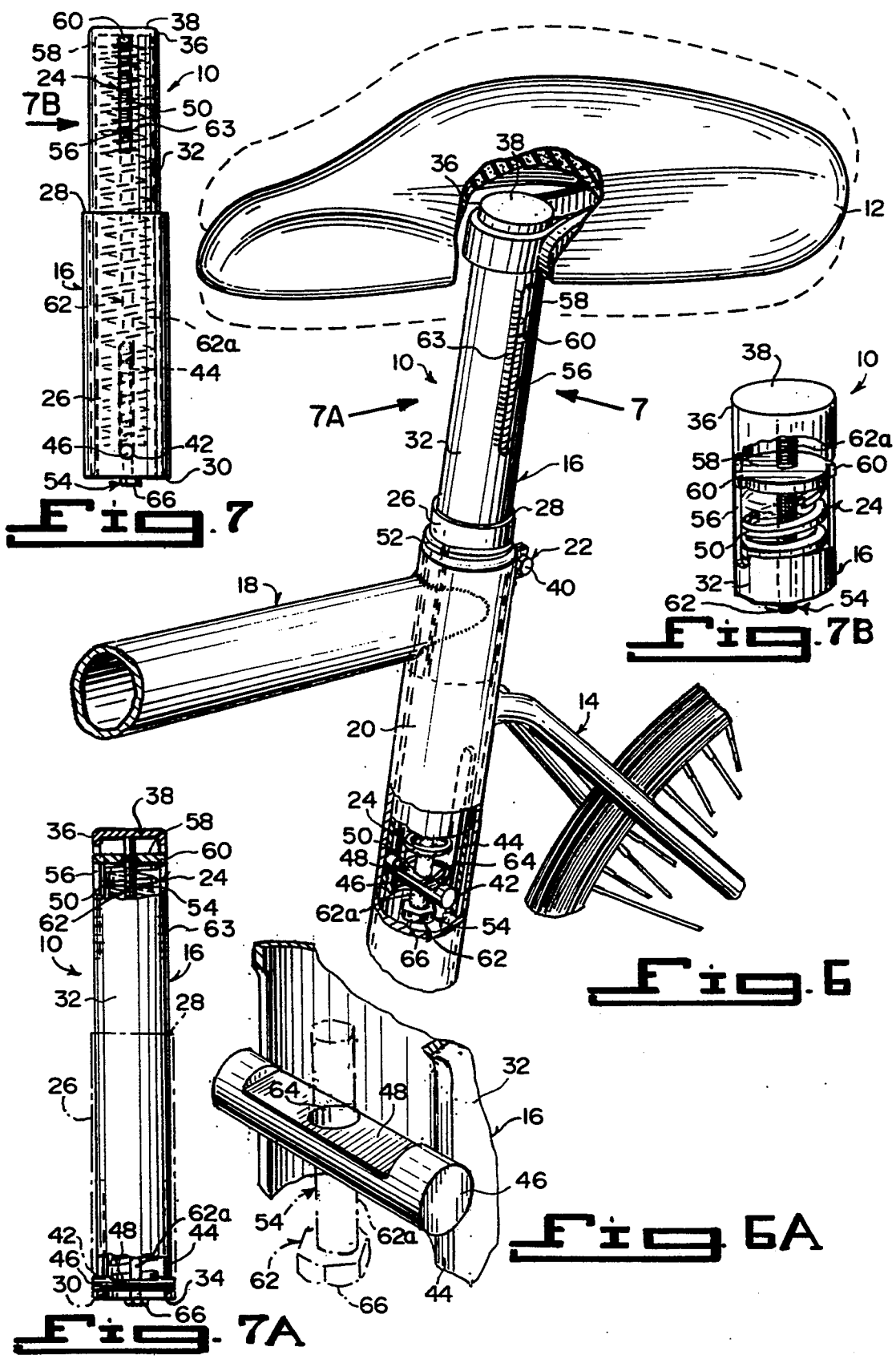

5,382,039

1

SUSPENSION DEVICE FOR A SEAT OF A BICYCLE

BACKGROUND OF THE INVENTION

1. Field of the Invention

The instant invention relates generally to bicycle seat supports and more specifically it relates to a suspension device for a seat of a bicycle.

2. Description of the Prior Art

Numerous bicycle seat supports have been provided in prior art that are adapted to cushion the riders of the bicycles against shocks and impacts and improve comfort of the rides. While these units may be suitable for the particular purpose to which they address, they would not be as suitable for the purposes of the present invention as heretofore described.

SUMMARY OF THE INVENTION

A primary object of the present invention is to provide a suspension device for a seat of a bicycle that will overcome the shortcomings of the prior art devices.

Another object is to provide a suspension device for a seat of a bicycle in which the device contains a shock absorbing structure to extend between the seat and the frame of the bicycle for a smooth comfortable ride to a person sitting on the seat.

An additional object is to provide a suspension device for a seat of a bicycle that is a simple alternative to the more complex supports now available on some bicycles.

A further object is to provide a suspension device for a seat of a bicycle that can be completely adjustable from the standpoint of a riders weight, a riders height and is adaptable to fit any sized bicycle.

A still further object is to provide a suspension device lot a seat of a bicycle that is simple and easy to use.

A still further object is to provide a suspension device for a seat of a bicycle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 2 is a perspective view with parts broken away and in section of a second embodiment of the instant invention being top adjustable, which is mounted between a seat and a seat tube on a bicycle frame.

FIG. 2A is an elevational view with parts broken away and in section of a lower portion of the second embodiment taken in the direction of arrow 2A in FIG. 2.

FIG. 2B is an enlarged perspective view of the retainer pin and a portion of the compression spring in phantom, shown in greater detail.

FIG. 6 is a perspective view with parts broken away and in section of a third embodiment of the instant invention being bottom adjustable, which is mounted between a seat and a seat tube on a bicycle frame.

FIG. 6A is an enlarged perspective view with parts broken away, in section and in phantom, showing the retainer pin in greater detail.

FIG. 7 is an elevational view of the third embodiment taken in the direction of arrow 7 in FIG. 6 with the split collar removed therefrom.

FIG. 7A is an elevational view of the third embodiment with parts broken away, in section and in phantom taken in the direction of arrow 7A in FIG. 6 with the split collar removed therefrom.

FIG. 7B is a perspective view with parts broken away of an upper portion of the third embodiment taken in the direction of arrow 7B in FIG. 7.

DETAILED DESCRIPTION OF THE PREFERRED EMBODIMENTS

Figures 1, 1A, 1B:
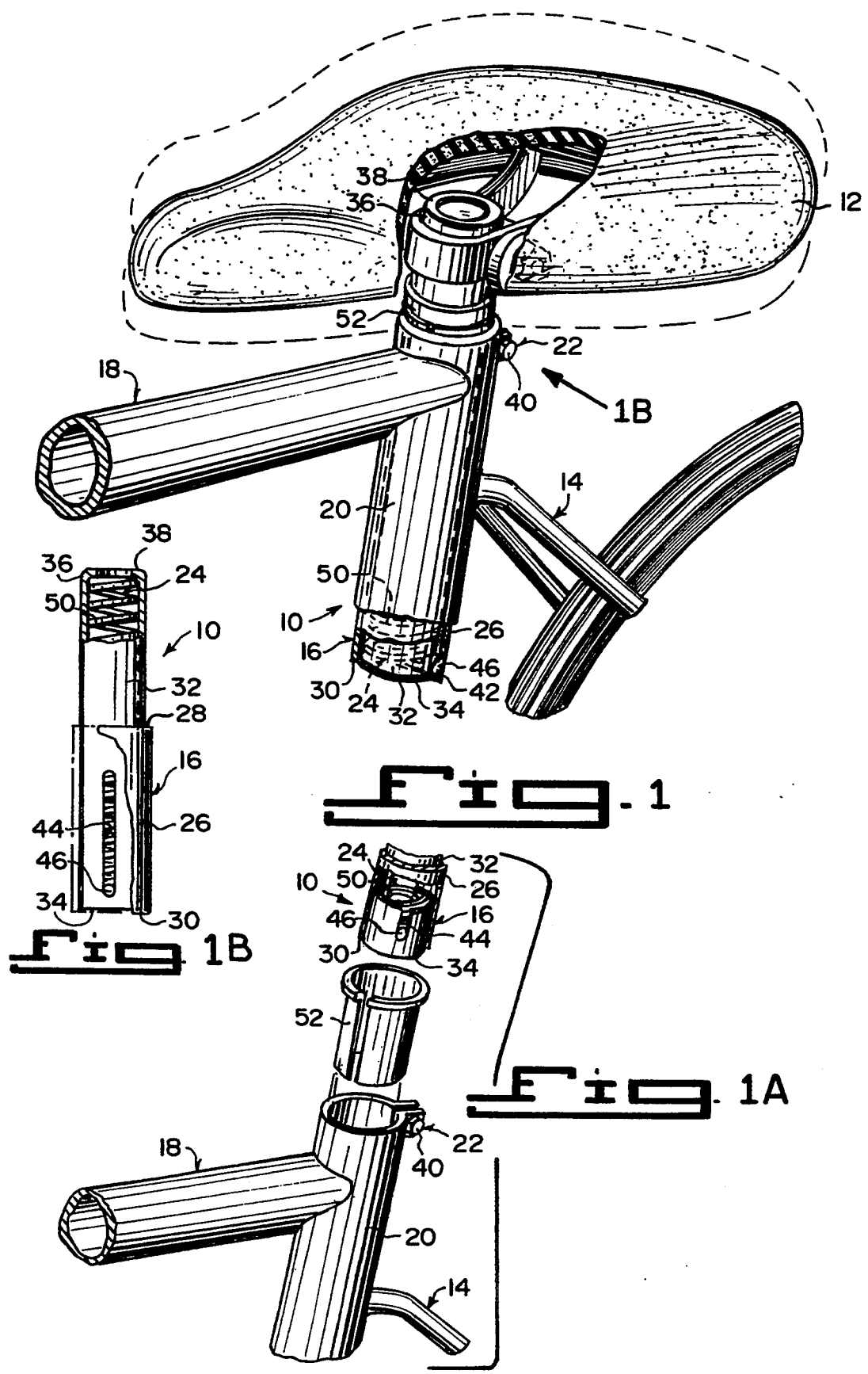
FIG. 1 is a perspective view with parts broken away and in section of a first embodiment of the instant invention being non-adjustable and which is mounted between a seat and a seat tube on a bicycle frame.
FIG. 1A is a partly exploded perspective view with parts broken away and in section of the first embodiment extended from the seat tube on the bicycle frame.
FIG. 1B is an elevational view with parts broken away, in section and in phantom taken in the direction of arrow 1B in FIG. 1 with the split collar removed therefrom.
Figure 3:
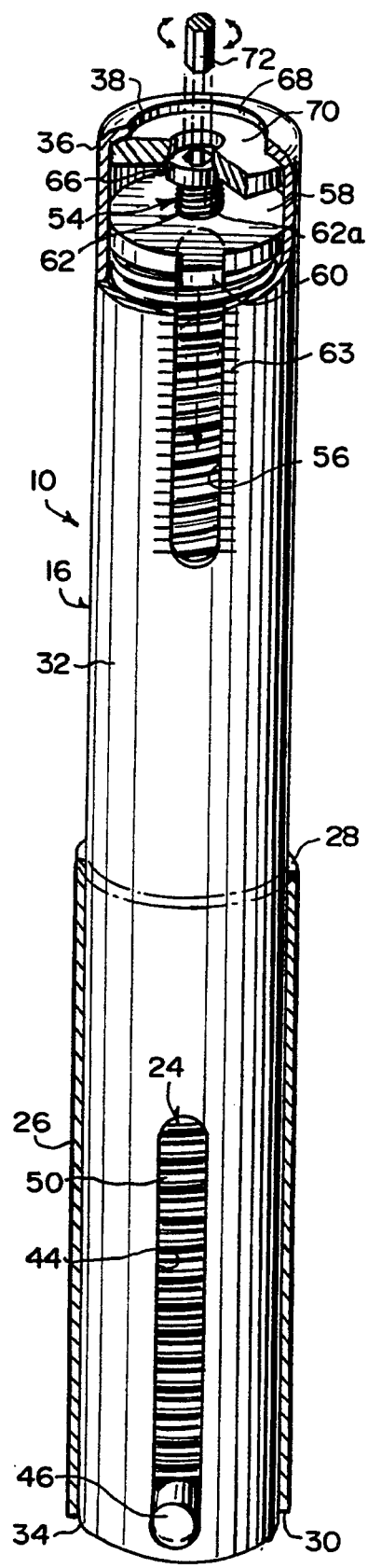
FIG. 3 is an enlarged perspective view with parts broken away and in section of the second embodiment taken in the direction of arrow 3 in FIG. 2, with the split collar removed therefrom.
Figure 4:
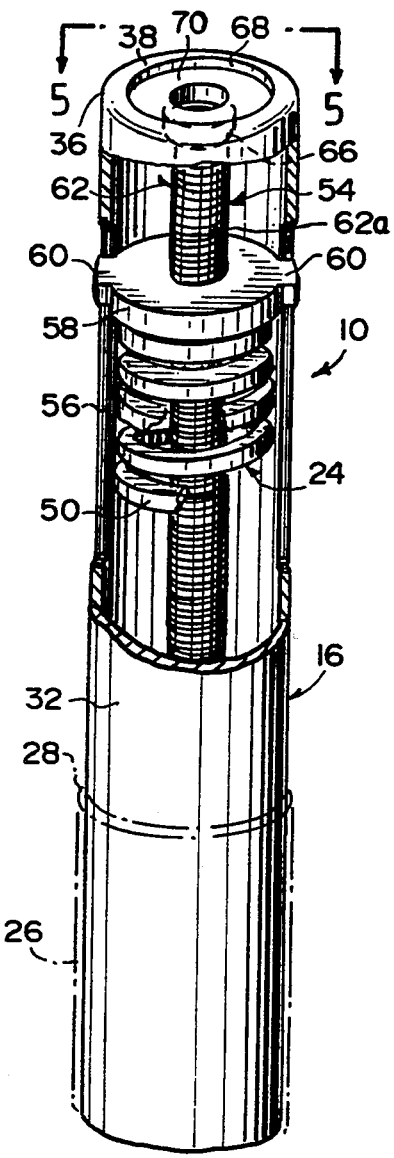
FIG. 4 is an enlarged perspective view with parts broken away and in section of the upper portion of the second embodiment taken in the direction of arrow 4 in FIG. 2.
Figure 5:
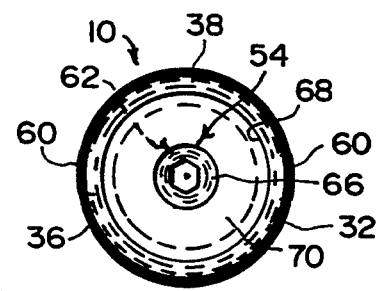
FIG. 5 is a top view taken in the direction of arrow 5—5 in FIG. 4.

Turning now descriptively to the drawings, in which similar reference characters denote similar elements throughout the several views, FIGS. 1 through 1B show a suspension device 10, that is non-adjustable is for a seat 12 of a bicycle 14, which consists of a telescoping seat post 16 for carrying the seat 12. The bicycle 14 has a frame 18 with a generally upright seat tube 20, for receiving the seat post 16. A structure 22 is for securing the seat post 16 to the seat tube 20. An apparatus 24 is within the seat post 16, for absorbing a shock received to the frame 18, thereby eliminating a jarring condition normally caused to a rider sitting on the seat 12, while the bicycle 14 travels over rough surfaces.

The telescoping seat post 16 includes an elongated tubular outer member 26, adapted to be inserted within the seat tube 20. The outer member 26 has open upper and lower ends 28, 30. An elongated tubular inner member 32 is slideable within the outer member 26 with an upper end of the inner member 32 protruding through the open upper end 28 of the outer member 26 and is adapted to carry the seat 12. The inner member 32 has an open lower end 34 and an upper end 36 with a stop formation 38 thereon.

The securing structure 22 is a bolt clamp 40 on the seat tube 20, which is tightened after the outer member 26 of the seat post 16 is inserted within the seat tube 20.

The shock absorbing apparatus 24 consists of the elongated tubular outer member 26 having a pair of aligned apertures 42 near its open lower end 30. The elongated tubular inner member 32 has a pair of aligned longitudinal slots 44 near its open lower end 34. A retainer pin 46 is provided, having a countersunk area 48 thereon. The retainer pin 46 extends through the aligned apertures 42 in the outer member 26 and the aligned longitudinal slots 44 in the inner member 32, with the countersunk area 48 facing upwardly. A compression spring 50 which sits upon the countersunk area 48, holds the retainer pin in place and extends between the countersunk area 48 of the retainer pin 46 and the stop formation 38 at the upper end of the inner member 32, thereby maintaining a resistive force between the outer member 26 and the inner member 32. This allows the longitudinal slots 44 to move up and down past the ends of the retainer pin 46. A split collar 52 is insertable into the seat tube 20 having a different diameter, so as to adjustably compensate for the outer member 26 of the seat post 16, when inserted within the seat tube 20.

The suspension device 10, as shown in FIGS. 2 through 7B can further contain a mechanism 54 in the seat post 16, for adjusting the tension of the compression spring 50 to accommodate different rider weights and riding conditions.

The compression spring tension adjusting mechanism 54 consists of the elongated tubular inner member 32 having a second pair of aligned longitudinal slots 56 near its upper end 36. A pretensioning washer and weight indicator 58 has a pair of aligned tabs 60 extending therefrom to ride within the second longitudinal slots 56. The washer 58 sits upon the top of the compression spring 50. An elongate bolt 62 has a shank 62a, which is threaded through the washer 58 and extends through the compression spring 50 that sits upon the countersunk area 48 of the retainer pin 46. When the bolt 62 is turned, the threaded shank 62a will move the washer 58 up and down, to change the tension of the compression spring 50. A scale 63 is formed along one of the second slots 56, to indicate the weight set when the tabs 60 on the washer 58 are moved up and down.

The compression spring tension adjusting mechanism 54 in FIGS. 6 through 7B is bottom adjustable and includes the retainer pin 46 having a transverse hole 64 therethrough, so that an unthreaded portion of the shank 62a of the bolt 62 can extend through the transverse hole 64 with a distal end of the shank 62a against the stop formation 38 and its head 66 down to be turned therefrom.

The compression spring tension adjusting mechanism 54 in FIGS. 2 through 5 is top adjustable and consists of the stop formation 38 on the upper end 36 of the tubular inner member 32 having an opening 68 therethrough. A restraint washer 70 is placed within the tubular inner member 32 against the stop formation 38, so that the elongate bolt 62 can thread through the pretensioning washer 58 with its head 66 up against the restraint washer 70, to allow a tool 72 to pass therethrough to turn the elongate bolt 62.

The shock absorbing apparatus 24 shown in the drawings, contains the compression spring 50. Other types of shock absorbing apparatus 24 can also be used, such as rubber or other elastomeric materials, extension springs and actual shock absorbers.

LIST OF REFERENCE NUMBERS 10 suspension device
12 seat
14 bicycle
16 telescoping seat post
18 frame of 14
20 seat tube on 18
22 securing structure
24 shock absorbing apparatus
26 elongated tubular outer member
28 open upper end of 26
30 open lower end of 26
32 elongated tubular inner member
34 open lower end of 32
36 upper end of 32
38 stop formation on 36
40 bolt clamp for 22
42 aperture in 26
44 longitudinal slot in 32
46 retainer pin
48 countersunk area on 46
50 compression spring
52 split collar
54 compression spring tension adjusting mechanism
56 second longitudinal slot in 32
58 pretensioning washer and weight indicator
60 tab on 58
62 elongate bolt
62a threaded shank of 62
63 scale at 56
64 transverse hole in 46
66 head of 62
68 opening in 38
70 restraint washer
72 tool It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by letters patent is set forth in the appended claims:

1. A suspension device for a seat of a bicycle which comprises:
 a) a telescoping seat post for carrying the seat, said telescoping seat post including an elongated tubular outer member adapted to be inserted within said seat tube, said outer member having open upper and lower ends, and an elongated tubular inner member slideable within said outer member with an upper end of said inner member protruding through the open upper end of said outer member and adapted to carry the seat, said inner member having an open lower end and an upper end with a stop formation thereon;
 b) said bicycle having a frame with a generally upright seat tube for receiving said seat post;
 c) means for securing said seat post to said seat tube, said securing means being a bolt clamp on said seat tube, which is tightened after said outer member of said seat post is inserted within said seat tube; and d) means within said seat post, for absorbing a shock received to said frame, thereby eliminating a jarring condition normally caused to a rider sitting on the seat, while the bicycle travels over rough surfaces, said shock absorbing means including said elongated tubular outer member having, a pair of aligned apertures near its open lower end, said elongated tubular inner member having a pair of aligned longitudinal slots near its open lower end, a retainer pin having a countersunk area thereon, said retainer pin extends through said aligned apertures in said outer member and said aligned longitudinal slots in said inner member with said countersunk area facing upwardly, and a compression spring which sits upon said countersunk area, holds said retainer pin in place and extends between said countersunk area of said retainer pin and said stop formation at the upper end of said inner member, thereby maintaining a resistive force between said outer member and said inner member, allowing said longitudinal slots to move up and down past the ends of said retainer pin.

2. A suspension device as recited in claim 1, further including a split collar insertable into said seat tube having a different diameter, so as to adjustably compensate for said outer member of said seat post when inserted within said seat tube.

3. A suspension device as recited in claim 2, further including means in said seat post for adjusting the tension of said compression spring to accommodate different rider weights and riding conditions.

4. A suspension device as recited in claim 3, wherein said compression spring tension adjusting means includes:
   a) said elongated tubular inner members having a second pair of aligned longitudinal slots near its upper end;
   b) a pretensioning washer and weight indicator having a pair of aligned tabs extending therefrom to ride within said second longitudinal slots, said washer sits upon the top of said compression spring;
   c) an elongate bolt having a shank threaded through said washer and extending through said compression spring that sits upon said countersunk area of said retainer pin so that when said bolt is turned, said threaded shank will move said washer up and down to change the tension of said compression spring.

5. A suspension device as recited in claim 4, further including a scale formed along one of said second slits to indicate the weight set when said tabs on said washer are moved up and down.

6. A suspension device as recited in claim 5, wherein said compression spring tension adjusting means is bottom adjustable and includes said retainer pin having a transverse hole therethrough, so that an unthreaded portion of said shank of said bolt can extend through said transverse hole with a distal end of said shank against said stop formation and its head down to be turned therefrom.

7. A suspension device as recited in claim 5, wherein said compression spring tension adjusting means is top adjustable and includes:
   a) said stop formation on the upper end of said tubular inner member having an opening therethrough; and
   b) a restraint washer placed within said tubular inner member against said stop formation, so that said elongate bolt can thread through said pretensioning washer with its head up against said restraint washer to allow a tool to pass therethrough to turn said elongate bolt.

* * * * *